Patented Apr. 27, 1943

2,317,456

UNITED STATES PATENT OFFICE 2,317,456

FORMALDEHYDE-CROTONALDEHYDE CONDENSATION PRODUCT

William E. Hanford and Richard S. Schreiber, Wilmington, Del., assignors to E. I. du Pont de Nemours & Company, Wilmington, Del., a corporation of Delaware No Drawing. Application October 28, 1939, Serial No. 301,763

18 Claims. (Cl. 260—602)

This invention relates to the production of oxygenated aldehydes and to the alcohols produced by the conversion of the aldehyde group to an alcohol group.

This invention has as an object the preparation of high molecular weight oxygenated aldehydes. Another object is the preparation of high molecular weight water-soluble and water-insoluble oxygenated aldehydes from formaldehyde and crotonaldehyde. Still another object is to produce high molecular weight polyhydric alcohols by hydrogenating the above mentioned high molecular weight oxygenated aldehydes. Another object is the preparation of certain new chemical compounds. Other objects will be apparent from the following description of the invention.

These objects may be accomplished by condensing formaldehyde with crotonaldehyde in the presence of an alkaline catalyst so as to form oxygenated unsaturated aldehydes which are either water-insoluble or water-soluble, depending upon the ratio of formaldehyde to crotonaldehyde used. These oxygenated unsaturated aldehydes may then be reduced to the corresponding saturated or unsaturated alcohols.

The following examples set forth certain well defined instances of the application of this invention. They are, however, not to be considered as limitations thereof, since many modifications may be made without departing from the spirit and scope of this invention.

Example I

Ten hundred fifty grams of crotonaldehyde were mixed with 1120 cc. of formalin (40% formaldehyde), then 60 grams of powdered calcium oxide added, and the solution stirred vigorously. The reaction mixture began to warm up slowly, and when the temperature had reached 60° to 70° C., it was maintained there throughout the remainder of the reaction. After one hour the total aldehyde content had fallen to approximately one-third of the original value, and at this point the solution was treated with dilute sulfuric acid to lower the pH to 6.0. The resulting viscous, yellow syrup was then hydrogenated at 80° to 130° C. with 150 grams of nickel-on-kieselguhr catalyst, using pressures of 2000 to 3000 lbs./sq. in. After removing the hydrogenation catalyst and diluting the reaction mixture with water, 700 grams of a water-insoluble, viscous oil were obtained which gave the following results on analysis: C, 63.0; H, 9.65; mol. wt., 270; acetyl number 273.5. This material, which is a straw-colored, viscous oil, cannot be distilled without decomposition. It is soluble in ether, alcohol, and benzene, but insoluble in water and petroleum ether.

Example II

Twenty-four hundred cc. of formalin (40% formaldehyde) were mixed with 560 grams of crotonaldehyde, and the mixture treated with 75 grams of powdered calcium oxide. After vigorously agitating the reactants for 30 minutes, an additional 40 grams of powdered calcium oxide were added. After 2½ hours the odor of formaldehyde was very weak and the total aldehyde content had dropped to one-fifth the original value. The pH of the solution was adjusted to 7.0 by the addition of dilute sulfuric acid, and then the sample hydrogenated as in Example I, using 200 grams of nickel-on-kieselguhr catalyst. After filtering off the hydrogenation catalyst and removing most of the water under reduced pressure, the syrupy residue was dissolved in ethyl alcohol to remove most of the calcium sulfate. This alcoholic solution was again concentrated to a syrup which was again dissolved in alcohol to precipitate an additional small amount of calcium sulfate. After filtering off this material the filtrate was concentrated under a vacuum of 2 mm. at 100° C. in order to remove all low boiling materials. This treatment produced 1060 grams of light yellow syrup which gave the following analysis: C, 48.43; H, 8.67; mol. wt., 300; hydroxyl number, 906. This material, which cannot be distilled without decomposition, is soluble in water and alcohol but insoluble in benzene, ether, and petroleum ether.

Example III

One hundred five grams of crotonaldehyde were mixed with 30 grams of paraformaldehyde to produce a homogeneous mixture. At this point 3 grams of powdered calcium oxide were added, and then 2 cc. of 10% sodium hydroxide were introduced. The addition of this material raised the pH to approximately 10.0, and the reaction proceeded slowly as indicated by the gradual rise in temperature. At the end of 6 hours when the odor of formaldehyde had practically disappeared, the solution was treated with dilute sulfuric acid to lower the pH to 6.0. The sample was then hydrogenated as described in Example I, using 15 grams of nickel-on-kieselguhr catalyst. After filtering the hydrogenation catalyst and diluting the reaction mixture with water, 65 grams of a light yellow, viscous, water-insoluble oil were obtained which gave on analysis results comparable to those obtained in Example I.

In the practice of this invention any "formaldehyde substance," by which term is meant formaldehyde in the form of aqueous solutions or in any of its polymeric forms such as paraformaldehyde, or in the form of compounds which under the conditions of reaction yields formaldehyde, may be used.

Although it is not essential to use a solvent, it is preferred to operate in the presence of an inert solvent such as water, dioxane, benzene, toluene, etc. Solvents such as alcohols are unsuited because they react with the crotonaldehyde to form side reaction products with the result that the yield of desired products is decreased.

Any strongly alkaline catalyst will serve as a condensing agent for this type of reaction. The preferred condensing agents are the oxides or hydroxides of the alkali and alkaline earth elements such as calcium, sodium, barium, potassium, and magnesium. Due to the fact that acidic compounds are produced in small amounts during the condensation, it is usually necessary to use at least three per cent catalyst based on the reactants employed. In actual practice the amount of catalyst will range from 3 to 10%.

Temperatures ranging from 0° to 150° C. can be employed, but it is preferred to stay within the range of 25° to 100° C. in order to get satisfactory control during the condensation.

The ratio of the formaldehyde to the crotonaldehyde has a material effect upon the type of oxygenated unsaturated aldehydes produced by the condensation reaction. When equimolar ratios of crotonaldehyde to formaldehyde are used the main reaction products are water-insoluble, oxygenated unsaturated aldehydes with a small amount of a water-soluble product. This latter material gives analytical results which correspond closely to those given for the water-soluble material obtained above in Example II. Likewise, when the ratio of formaldehyde to crotonaldehyde is increased to 4:1, although the major product is a water-soluble, oxygenated unsaturated aldehyde, a small amount of water-insoluble material is produced which gives analytical results comparable to those mentioned above in Example I. The use of intermediate ratios of formaldehyde to crotonaldehyde produces water-soluble and water-insoluble oxygenated unsaturated aldehydes in amounts depending up on the formaldehyde: crotonaldehyde ratio.

In carrying out the catalytic reduction to obtain saturated, oxygenated alcohols, any hydrogenation catalyst may be used. It is generally preferred, however, to use a ferrous metal catalyst, especially metallic nickel or cobalt either in a massive form or supported on such materials as kieselguhr or silica gel. The amount of catalyst required ranges from 1% to 10% based on the reactant employed. In general the quantity of catalyst and conditions of hydrogenation are largely dependent on the type of catalyst used. In place of the ferrous metal catalysts there may be used mild acting hydrogenation catalysts such as silver, tin, cadmium, copper, etc., their oxides and chromites, and the oxides and chromites of manganese, iron, nickel, cobalt, etc.

In the hydrogenation step, temperatures in the range of 50° to 200° C. may be used and super- atmospheric pressures restricted only by the physical properties of the equipment used. As a rule, it is preferred to hydrogenate at temperatures in the range of 25° to 150° C. using pressures varying from 2000 to 4000 lbs. per square inch.

By means of the well known procedure of Meerwein, alpha, beta unsaturated carbonyl compounds can be reduced to the corresponding unsaturated alcohols in excellent yields. Thus, if desired, the oxygenated unsaturated alcohol corresponding to the oxygenated unsaturated aldehyde can readily be obtained by carrying out the reduction with aluminum alkoxides, preferably aluminum isopropoxide.

In order to obtain high yields of the high molecular weight oxygenated unsaturated aldehydes, it is preferable to stop the reaction when the total aldehyde content has dropped to approximately two-thirds or three-fourths of the original value. Although the reaction can be stopped almost completely by cooling the mixture to temperatures below 0° C., it is preferred to treat the mixture with an inorganic or organic acid until the pH has been lowered to a value in the range of 5.0 to 6.5.

The products of this invention are useful as plasticizers for organic cellulose derivatives, acrylic and methacrylic esters, etc., in the preparation of condensation products, e. g., by condensation with urea or phenol, or by reaction with polycarboxylic acids. The process of this invention provides a simple means of producing new types of oxygenated aldehydes and alcohols from cheap raw materials.

It is apparent that many widely different embodiments of this invention may be made without departing from the spirit and scope thereof and therefore it is not intended to be limited except as indicated in the appended claims.

We claim:

1. The process which comprises condensing a formaldehyde substance with crotonaldehyde in the presence of an alkaline catalyst and catalytically hydrogenating the condensation product so as to convert the aldehyde group contained therein to an alcohol group, said reaction being further characterized in that the formaldehyde substance and the crotonaldehyde are the sole reactants present in the condensation reaction.

2. The process which comprises condensing a formaldehyde substance with crotonaldehyde at a temperature between 0° C. and 150° C. and in the presence of an alkaline catalyst and catalytically hydrogenating the condensation product, said reaction being further characterized in that the formaldehyde substance and the crotonaldehyde are the sole reactants present in the condensation reaction.

3. The process which comprises condensing crotonaldehyde with a formaldehyde substance in the presence of an alkaline catalyst at a temperature between 0° C. and 150° C. and in an aqueous medium, and catalytically hydrogenating said product of condensation, said reaction being further characterized in that the formaldehyde substance and the crotonaldehyde are the sole reactants present in the condensation reaction.

4. The process in accordance with claim 2 characterized in that the condensation reaction is carried out at a temperature within the range of 25° to 100° C.

5. The process which comprises condensing crotonaldehyde with a formaldehyde substance in the presence of an alkaline catalyst at a temperature between 0° C. and 150° C., stopping the reaction when about two-thirds to three-fourths of the original aldehyde content has been condensed by adding thereto an acid in quantity sufficient to reduce the pH of the solution to from 5.1 to 6.5 and catalytically hydrogenating the resulting condensation products so as to convert the aldehyde products contained therein to alcohols, said reaction being further characterized in that the formaldehyde substance and the crotonaldehyde are the sole reactants present in the condensation reaction.

6. The process in accordance with claim 5 characterized in that the condensation step is carried out at a temperature between 25° C. and 100° C.

7. A process for the preparation in high yields of water-soluble, high molecular weight, oxygenated aldehydes which consists in condensing crotonaldehyde with a formaldehyde substance in the presence of an alkaline catalyst at a temperature between 0° C. and 150° C. and with a molecular ratio of crotonaldehyde to formaldehyde substance of the order of 1:4, said reaction being further characterized in that the formaldehyde substance and the crotonaldehyde are the sole reactants present in the condensation reaction.

8. A process for the preparation in high yields of water-insoluble, high molecular weight, oxygenated aldehydes which consists in condensing crotonaldehyde with a formaldehyde substance in the presence of an alkaline catalyst at a temperature between 0° C. and 150° C. and with a molecular ratio of crotonaldehyde to formaldehyde substance of the order of 1:1, said reaction being further characterized in that the formaldehyde substance and the crotonaldehyde are the sole reactants present in the condensation reaction.

9. The process which consists in condensing a formaldehyde substance with crotonaldehyde in the presence of an alkaline catalyst, said reaction being further characterized in that the formaldehyde substance and the crotonaldehyde are the sole reactants present in the condensation reaction.

10. The process which consists in condensing crotonaldehyde with a formaldehyde substance in the presence of an alkaline catalyst at a temperature between 25° and 100° C. in an aqueous medium, said reaction being further characterized in that the formaldehyde substance and the crotonaldehyde are the sole reactants present in the condensation reaction.

11. The process which consists in condensing crotonaldehyde with a formaldehyde substance in the presence of an alkaline catalyst at a temperature between 25° and 100° C. in an aqueous medium and stopping the reaction when approximately two-thirds to three-fourths of the total original aldehyde content has been condensed, said reaction being further characterized in that the formaldehyde substance and the crotonaldehyde are the sole reactants present in the condensation reaction.

12. The process which comprises catalytically hydrogenating, in the presence of a ferrous group metal catalyst, the high molecular weight oxygenated aldehyde obtained by condensing, as sole reactants, a formaldehyde substance with crotonaldehyde, under alkaline conditions.

13. The process in accordance with claim 12 characterized in that the hydrogenation reaction is carried out between 25° and 200° C.

14. The process in accordance with claim 12 characterized in that the hydrogenation reaction is carried out in the presence of a hydrogenation catalyst comprising nickel and cobalt.

15. A high molecular weight oxygenated aldehyde obtainable by condensing a formaldehyde substance with crotonaldehyde in the presence of an alkaline catalyst, said reaction being further characterized in that the formaldehyde substance and the crotonaldehyde are the sole reactants present in the condensation reaction.

16. A water-soluble high molecular weight oxygenated aldehyde obtainable by condensing crotonaldehyde with a formaldehyde substance in the presence of an alkaline catalyst at a temperature between 0° C. and 150° C. and with a molecular ratio of crotonaldehyde to formaldehyde substance of about 1:4, said reaction being further characterized in that the formaldehyde substance and the crotonaldehyde are the sole reactants present in the condensation reaction.

17. A water-insoluble high molecular weight oxygenated aldehyde obtainable by condensing crotonaldehyde with a formaldehyde substance in the presence of an alkaline catalyst at a temperature between 0° C. and 150° C. and with a molecular ratio of crotonaldehyde to formaldehyde substance of about 1:1, said reaction being further characterized in that the formaldehyde substance and the crotonaldehyde are the sole reactants present in the condensation reaction.

18. A polyhydroxy compound obtainable by catalytically hydrogenating the high molecular weight oxygenated aldehyde defined by claim 15.

WILLIAM E. HANFORD.
RICHARD S. SCHREIBER.